US011951746B2

(12) United States Patent
Pryde et al.

(10) Patent No.: US 11,951,746 B2
(45) Date of Patent: Apr. 9, 2024

(54) DEVICE FOR CONTROLLING ACCESS TO CONTAINERS FOR DISPENSING PRINTING MATERIAL

(71) Applicants: James R. Pryde, Shropshire (GB); Mark Smith, Shropshire (GB); Robert Hargreaves, Shropshire (GB)

(72) Inventors: James R. Pryde, Shropshire (GB); Mark Smith, Shropshire (GB); Robert Hargreaves, Shropshire (GB)

(73) Assignee: Ricoh Company, Ltd., Tokyo (JP)

( * ) Notice: Subject to any disclaimer, the term of this patent is extended or adjusted under 35 U.S.C. 154(b) by 331 days.

(21) Appl. No.: 17/429,748

(22) PCT Filed: Mar. 6, 2020

(86) PCT No.: PCT/JP2020/009734
§ 371 (c)(1),
(2) Date: Aug. 10, 2021

(87) PCT Pub. No.: WO2020/184442
PCT Pub. Date: Sep. 17, 2020

(65) Prior Publication Data

US 2022/0118766 A1 Apr. 21, 2022

(30) Foreign Application Priority Data

Mar. 13, 2019 (GB) ..................................... 1903438

(51) Int. Cl.
*B41J 2/175* (2006.01)
*G03G 15/08* (2006.01)

(52) U.S. Cl.
CPC ...... *B41J 2/17523* (2013.01); *G03G 15/0877* (2013.01)

(58) Field of Classification Search
CPC ............ B41J 2/17523; G03G 15/0877; G03G 15/556; G03G 2221/1654; G03G 15/0872; G03G 21/1647; G03G 21/1633
USPC ................................................................ 347/6
See application file for complete search history.

(56) References Cited

U.S. PATENT DOCUMENTS 6,560,416 B2 5/2003 Fischer
8,396,379 B2 3/2013 Tsukijima
2013/0250013 A1* 9/2013 Koichi .................. B41J 19/202 347/86
2017/0102637 A1 4/2017 Seto
2018/0164725 A1* 6/2018 Takahashi .......... G03G 21/1676

FOREIGN PATENT DOCUMENTS

JP 2005-091462 4/2005

OTHER PUBLICATIONS

International Search Report dated Jun. 2, 2020 in PCT/JP2020/009734 filed on Mar. 6, 2020.

* cited by examiner

*Primary Examiner* — Matthew Luu
*Assistant Examiner* — Alexander D Shenderov
(74) *Attorney, Agent, or Firm* — IPUSA, PLLC

(57) ABSTRACT

A device (1) for controlling user access to at least one container (4) for dispensing printing material housed by a printing apparatus (5), the device (1) comprising an openable and closable barrier (2) corresponding to the container (4) and a lock for locking the barrier (2) in a closed position. The lock is overlapped by at least a portion of the barrier (2) both when the barrier (2) is in the closed position and when the barrier (2) is in an open position.

15 Claims, 7 Drawing Sheets

[Fig. 1]
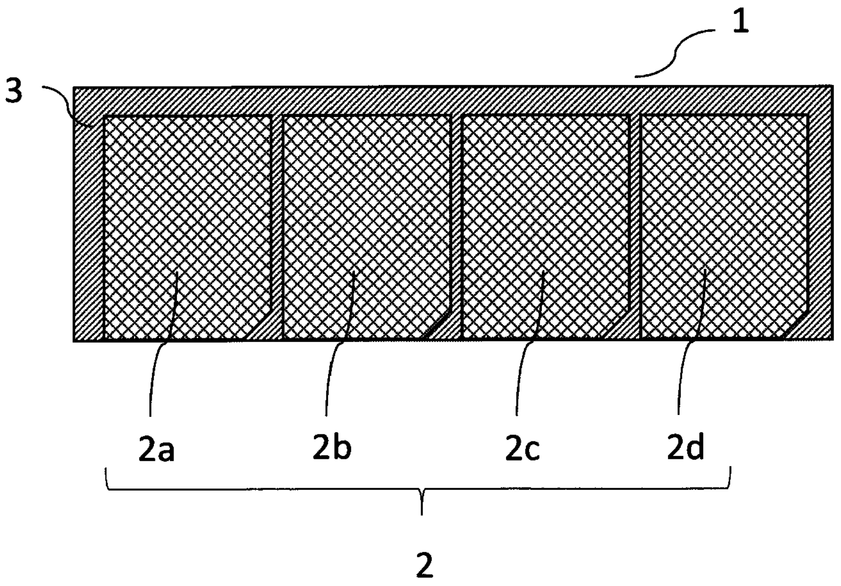
[Fig. 2A]
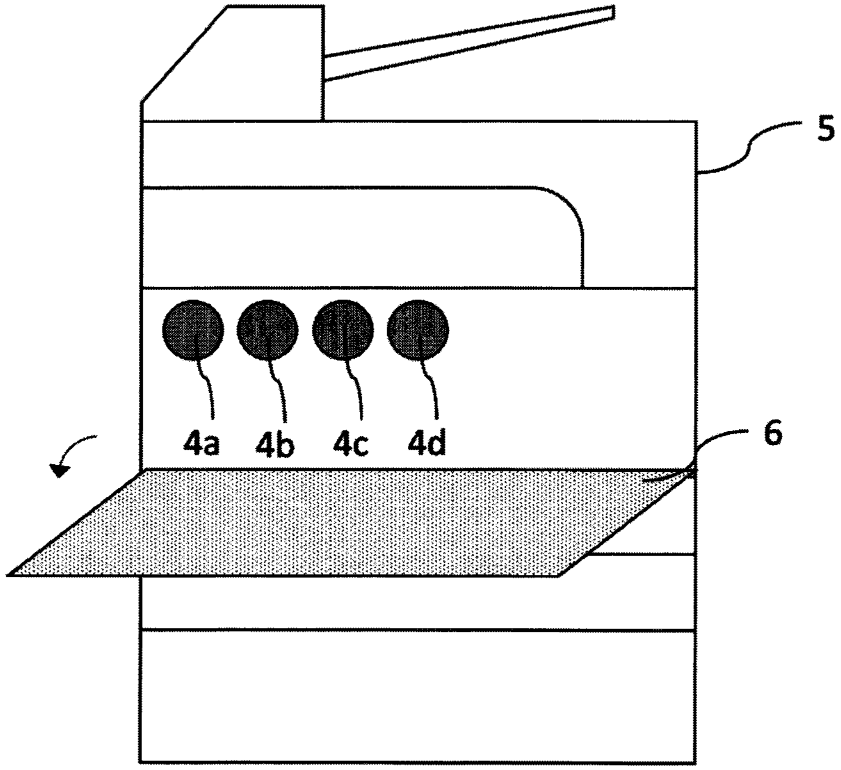

[Fig. 2B]
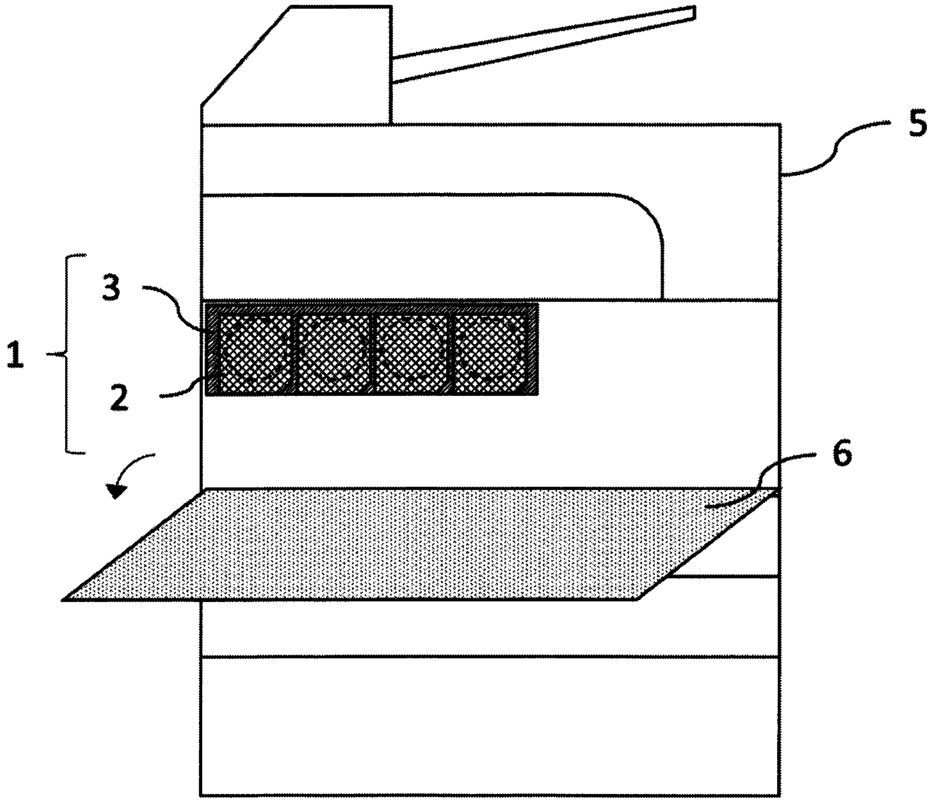
[Fig. 3]
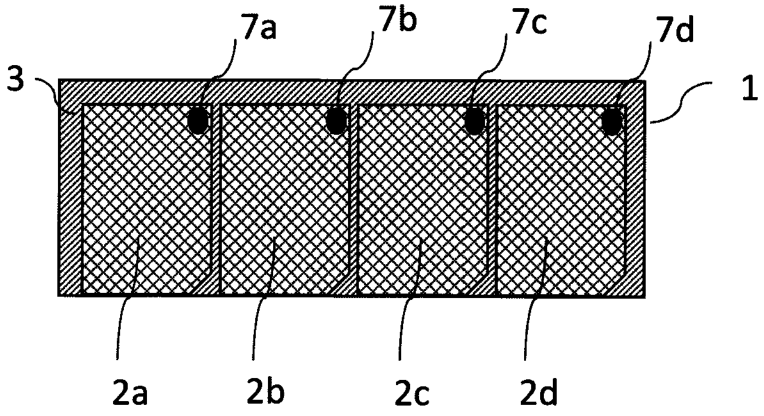

[Fig. 4]
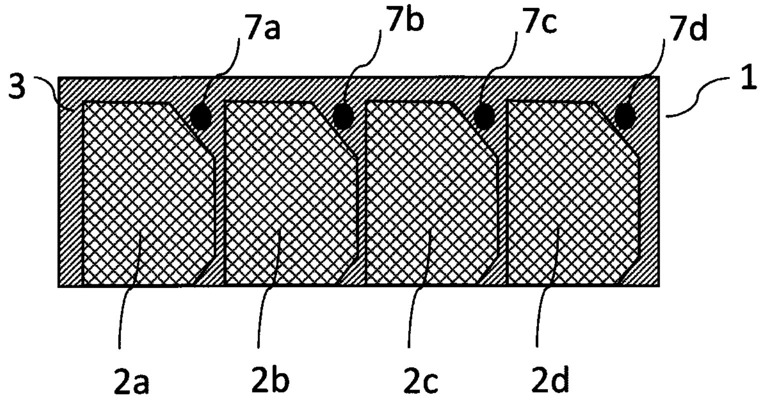
[Fig. 5A]
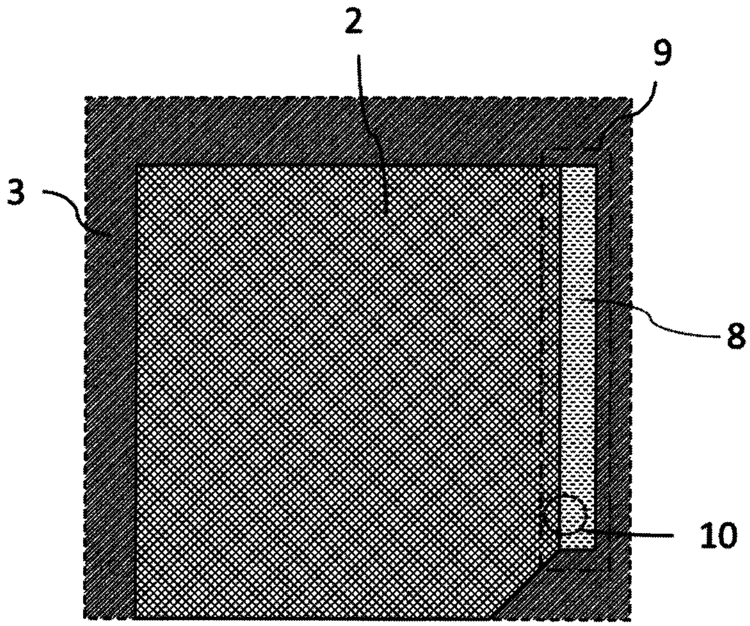

[Fig. 5B]
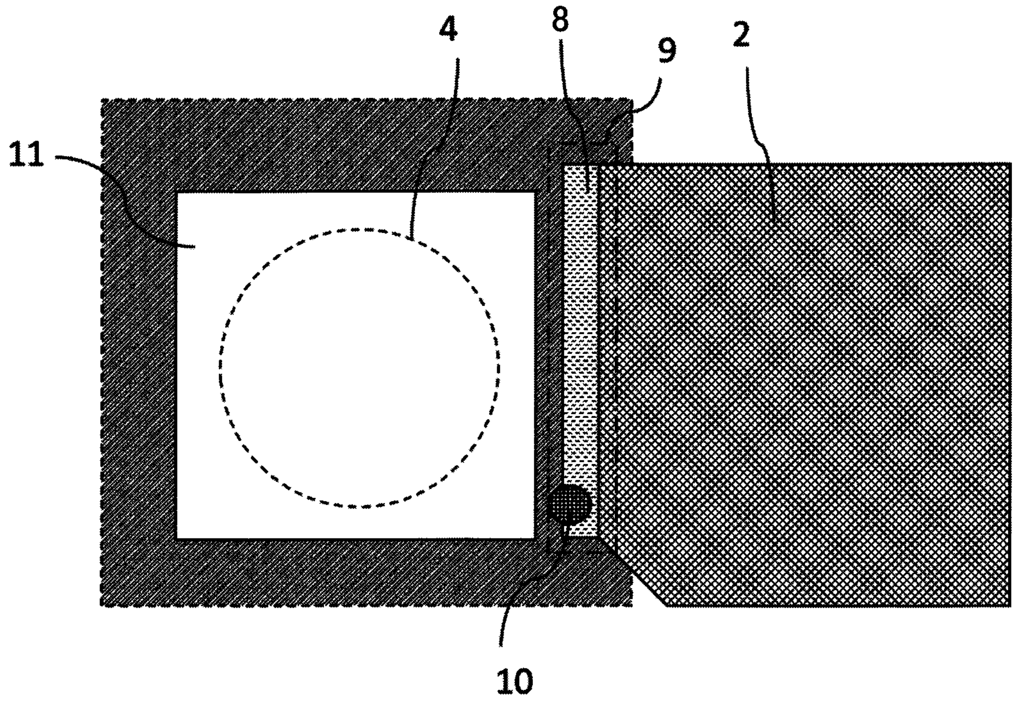
[Fig. 6A]
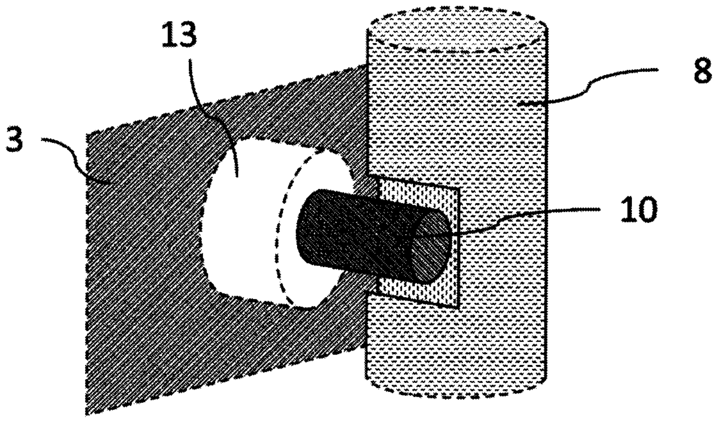

[Fig. 6B]
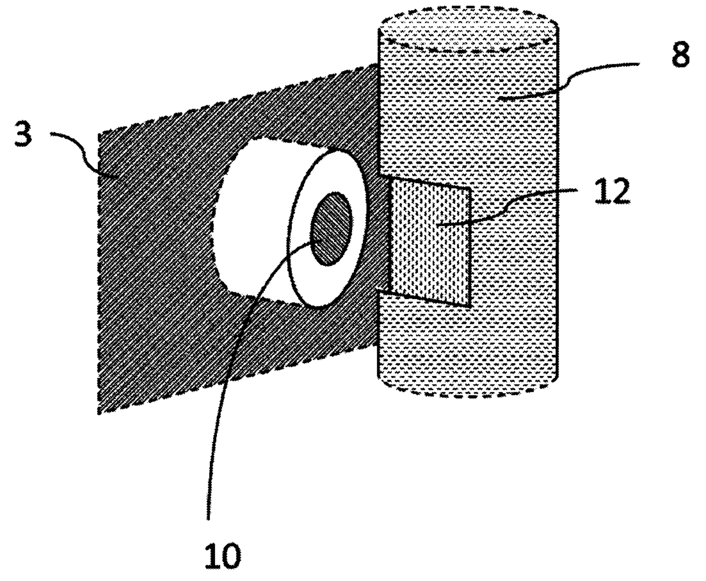

[Fig. 7]
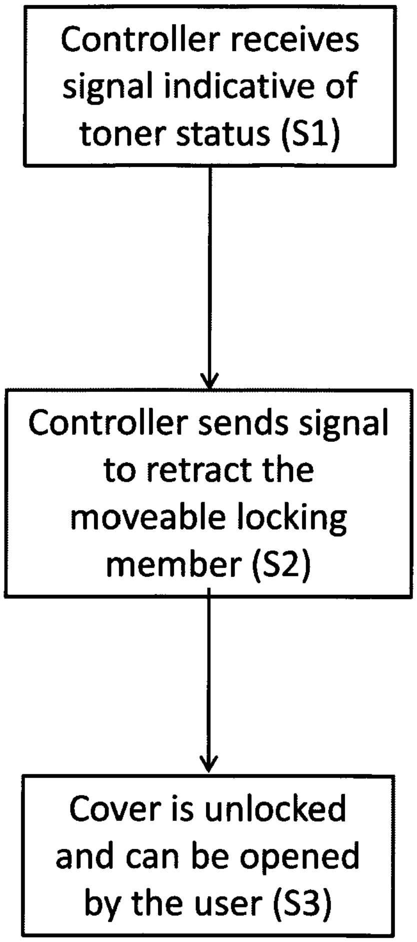

[Fig. 8]
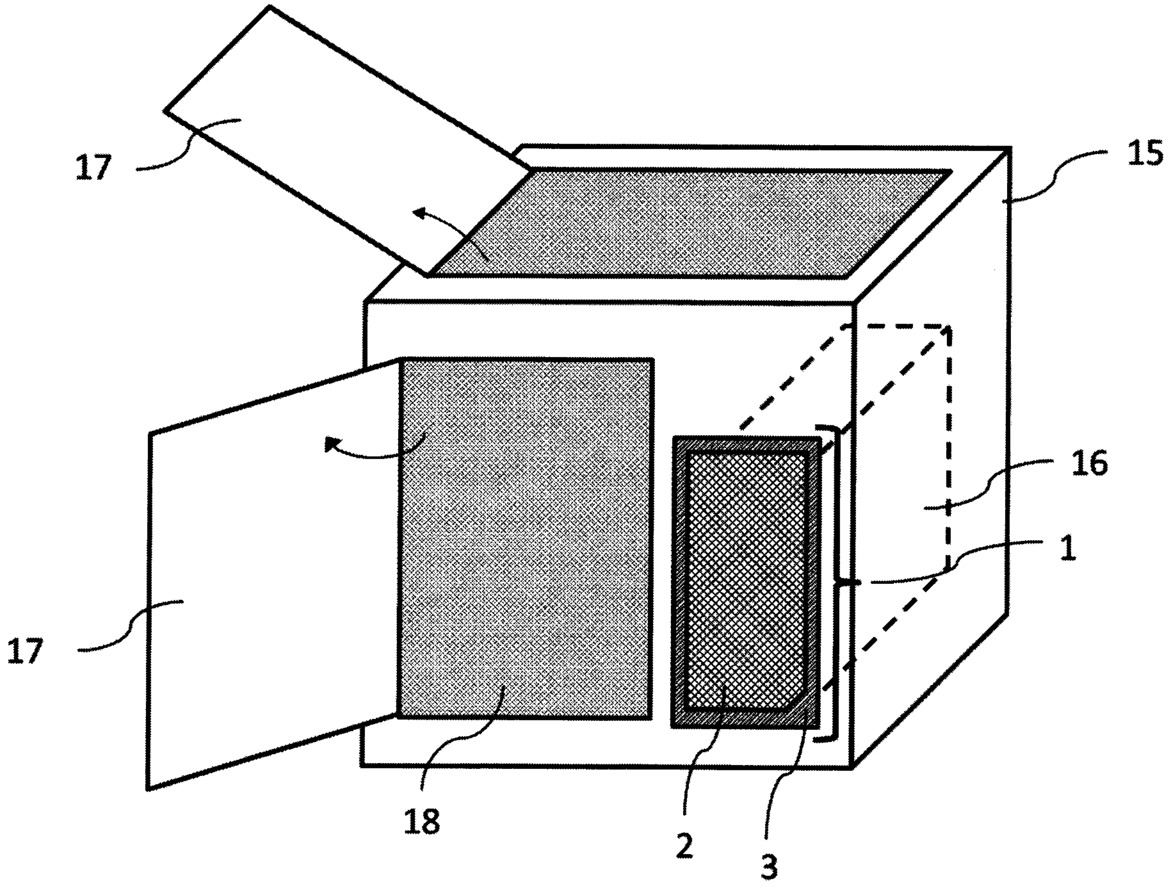

DEVICE FOR CONTROLLING ACCESS TO CONTAINERS FOR DISPENSING PRINTING MATERIAL

TECHNICAL FIELD

The present invention relates to a device for controlling access to containers for dispensing printing material housed by a printing apparatus.

BACKGROUND ART

Many image forming apparatuses allows users to replace toner cartridges at any time. As a result, users frequently replace toner cartridges prematurely.

There are significant economic, commercial and environmental impacts associated with this under-utilisation of toner cartridges:

- waste toner carries a significant cost;
- waste toner may not be disposed of responsibly, posing a potential safety and ecological hazard that also represents a significant risk to the supplier's reputation;
- unused toner can foreseeably be collected and resold without undergoing the processing/quality control necessary to meet original specifications such that an inferior product on the market would pose a significant risk to the original toner supplier's reputation;
- additional materials are unnecessarily consumed in the production of toner and cartridge bottles to compensate for waste, having a direct environmental impact.

CITATION LIST

Patent Literature

[PTL 1] U.S. Pat. No. 8,396,379 B

[PTL 2] US-A-2002094210

SUMMARY OF INVENTION

Technical Problem

U.S. Pat. No. 8,396,379 B describes the implementation of a spring loaded door positioned over a toner cartridge, released via a control signal triggered by the user or toner status, with the intention of revealing only the toner cartridge requiring service. The apparatus is simply a door with a latch and a clearly visible release trigger, providing the user with means to manually open the door and including a conspicuous and easily defeatable lock mechanism. The apparatus is, thus, highly unlikely to prevent a user prematurely replacing a toner cartridge should the user be minded to do so.

Patent US-A-2002094210 describes a method of presenting a toner cartridge to an access way when replacement is necessary. The apparatus can also incorporate a lock device to prevent opening of cartridge access way and a visual indicator to identify the cartridge requiring service. That the lock device disclosed by this document is visible and externally accessible means that it is susceptible to tampering, which may result in premature user access to the toner cartridge.

Therefore, a device for preventing the replacement of toner cartridges, or any type of containers for dispensing printing material, until they have reached the end of their useful life is required. Such a device also precluding the possibility of tampering with the lock is desirable.

It is an object of the invention to provide means to control access to containers for dispensing printing material, with associated, commercial, financial and environmental benefits arising from the prevention of waste. It prevents tampering with or theft of the containers, which may be of particular value when the print equipment is sited in a public area.

Solution to Problem

According to an aspect of the present invention there is provided a device for controlling user access to at least one container for dispensing a printing material housed by an image forming apparatus. The device comprises an openable and closable barrier corresponding to the container and a lock for locking the barrier in a closed position. The lock is overlapped by at least a portion of the barrier both when the barrier is in the closed position and when the barrier is in an open position.

The lock may be overlapped by a part of a hinge portion of the barrier when the barrier is in the open position.

The lock may comprise a moveable locking member that cooperates with said part of the hinge portion in order to lock the barrier in a closed position.

An interior of said part of the hinge portion may be complementary in shape to the moveable locking member, whereby said part of the hinge portion is configured to receive the moveable locking member.

The lock may comprise a solenoid for moving the moveable locking member.

The device may further comprise a support to which the barrier is attached.

The device may further comprise an indicator for indicating whether the barrier is locked.

The device may further comprise a controller configured to unlock the barrier according to a signal indicative of a printing material status of the container.

The signal may indicate that the container is empty, empty being defined according to predetermined criteria.

The device may be configured to lock the barrier in a closed position in the event of a failure of the controller.

The device may further comprise a sensor for detecting the position of the barrier.

The barrier may be locked according to the sensed position.

The device may be configured to lock the barrier in a closed position in the event of power failure or a failure of the controller.

The container may be any one of a toner cartridge, a toner bottle, an ink bottle and an ink cartridge.

BRIEF DESCRIPTION OF DRAWINGS

FIG. 1 shows a frontal view of a device for controlling access to toner cartridges of an image forming apparatus for the case in which covers of the device are in a closed position.

FIG. 2A shows an example of an image forming apparatus to which the device of FIG. 1 may be attached.

FIG. 2B shows the device of FIG. 1 attached to the image forming apparatus of FIG. 2A.

FIG. 3 shows a possible location of indicators on the device of FIG. 1.

FIG. 4 shows another possible location of indicators on the device of FIG. 1.

FIG. 5A shows an enlarged frontal view of part of the device of FIG. 1 for the case in which the cover is in the closed position.

FIG. 5B shows an enlarged frontal view of part of the device of FIG. 1 for the case in which the cover is in an open position.

FIG. 6A shows a moveable locking member in an extended position.

FIG. 6B shows the moveable locking member in a retracted position.

FIG. 7 shows a flowchart of a process of unlocking a cover.

FIG. 8 shows an alternative embodiment where the device is attached to a 3D printer.

DESCRIPTION OF EMBODIMENTS

FIG. 1 shows a frontal view of a device (1) for controlling access to one or more exchangeable containers for dispensing image forming material or object forming material (i.e. containers for dispensing printing material), which may be, for example, toner cartridges. FIG. 1 shows a device for controlling access to exchangeable containers of a printing apparatus, such as an image forming apparatus (e.g. a printer) or an object forming apparatus (e.g. a 3D printer), for the case in which each cover (2*a*, 2*b*, 2*c*, 2*d*) of the device (1), each covering a corresponding toner cartridge, is in a closed position. An image forming apparatus includes, for example, printers, photocopiers, and multi-function peripheral (MFP) devices. Alternatively, the apparatus may be an apparatus used in additive manufacturing or in freeform fabrication, such as a 3D printer. The openable and closable covers (2) provide a barrier to accessing the toner cartridges. Therefore, if a cover (2) is locked in the closed position, a user cannot replace the corresponding toner cartridge housed by the image forming apparatus to which the device (1) is attached or in which the device (1) is incorporated. Typically, as implied, there is a one to one correspondence between cover (2) and toner cartridge but the device (1) is not restricted so.

As seen in FIG. 1, the device (1), when covers (2) are in the closed position, does not present any locking mechanism to the user (i.e. the locking mechanism is obscured by the covers (2), being located between each cover (2) and a surface of the image forming apparatus to which the device is attached). Moreover, the exterior of the device (1) may be constructed to minimise any purchase for the user to grab and force open the covers (2) when the covers (2) are in the closed position and locked.

The covers are shown as generally square or rectangular doors that each totally obscure corresponding toner cartridges housed by the image forming apparatus. The device (1) is not restricted to such covers (2) and may, in place of the covers (2), comprise barriers of any configuration, whereby user access to a toner cartridge can be controlled as will be described. For instance, covers (2) may be replaced by a bar(s), mesh, lattice, shutter(s) or a screen which all act to prohibit the user from accessing the toner cartridges when locked in the closed position. Any such barriers (e.g. covers (2)) may be supported by a support (3), as shown in FIG. 1, or, alternatively, may be fixed directly to the image forming apparatus.

FIG. 2A shows an example of an image forming apparatus (5), for example, an MFP, to which the device (1) may be attached. As shown in FIG. 2A, such an image forming apparatus (5) typically has a plurality of toner cartridges (4*a*, 4*b*, 4*c*, 4*d*) arranged in parallel. The image forming apparatus (5) of FIG. 2A includes a front cover panel (6), which is shown opened in FIG. 2A. When the front cover panel (6) is opened, the toner cartridges are accessible to the user and may be replaced at will (in the absence of the device (1)).

In FIG. 2B, the device (1) of FIG. 1 has been attached to the image forming apparatus (5) of FIG. 2A so that each of the covers (2) of the device (1) are aligned with each of the toner cartridges (4). The arrangement of the toner cartridges (4) in the exemplary image forming apparatus (5) means that the covers (2) of the device (1) shown in FIG. 1 are in parallel, but the device (1) may comprise one or more covers (2) in any arrangement as necessary to match the arrangement of toner cartridges of the image forming apparatus (5) to which the device (1) is attached. Note also that the device (1) is not limited in its application to an image forming apparatus (5) including toner cartridges (4), but can equally be used for controlling access to any type of container for dispensing image forming material, such as a colorant container, a toner bottle, an ink bottle or an ink cartridge, with the same associated advantages. For a 2D printer, such as an MFP, an image forming material is a material which is applied to the recording medium (e.g. paper) to produce the image, for example colorant, toner or ink. Attaching the device (1) to the image forming apparatus (5), as shown in FIG. 2B, means that access to the toner cartridges (4) can be controlled, and the user cannot replace the toner cartridges (4) at will.

The device (1) may include indicators (7*a*, 7*b*, 7*c*, 7*d*) for indicating whether covers (2) are closed and locked. For example, an indicator (7) may light up when a corresponding cover (2) is closed and locked to signal to the user that the corresponding toner cartridge (4) does not need to be, and cannot yet be, replaced. Therefore, there is no need for a user to try each cover until an unlocked one is found. As shown in FIG. 3, the indicators (7) may be located on the support (3) and protrude through openings (not shown) in the covers (2). Alternatively, as shown in FIG. 4, indicators (7) may be located on areas of the support (3) not covered by the covers (2). In FIG. 4, the corners of the covers (2) have been cut so that the indicators (7) are visible. Indicators (7) may, for example, each comprise an LED.

FIG. 5A shows an enlarged frontal view of part of the device (1) shown in FIG. 1, specifically one of the four covers (2) shown in FIG. 1 is shown in greater detail. As in FIG. 1, in FIG. 5A the cover (2) is in the closed position. FIG. 5B corresponds to FIG. 5A where the cover (2) has been unlocked and is in an open position. In both FIG. 5A and FIG. 5B, a hinge portion (8) of the cover (2) is a portion of the cover (2) that overlaps a portion of the support (3) along the axis about which the cover (2) pivots relative to the support (3). The portion of the support (3) that is overlapped is termed the hinge support portion (9). The cover (1) being unlocked such that the user is able to open it, as shown in FIG. 5B, means that the user can access the toner cartridge (4) through the opening (11) formed by the support (3) and replace the toner cartridge (4) if desired. FIG. 5A and FIG. 5B also both show a moveable locking member (10) which is involved in the locking and unlocking of the covers (2) of the device (1).

The feature of the moveable locking member (10) can be better understood from FIG. 6A and FIG. 6B, which show the lock of the device (1) which enables locking of the covers (2) when the cover (2) is in the closed position. The lock comprises the moveable locking member (10) referred to in relation to FIG. 5A and FIG. 5B and a solenoid (13), which envelops and holds the moveable locking member (10). FIG. 6A shows the moveable locking member in an extended position, whereas FIG. 6B shows the moveable locking member (10) in a retracted position.

Due to the location of the solenoid (13) and the moveable locking member (10), which together comprise the lock, on the hinge support portion (9) of the support (3), the lock is overlapped by at least a portion of the corresponding cover (2) both when the cover (2) is in the closed position (FIG. 5A) and when the cover (2) is in the open position (FIG. 5B), thereby concealing the lock from the user so that the device (1) cannot be corrupted and access to the toner cartridges (4) can be controlled. Preferably, the lock is overlapped a part of by the hinge portion (8), which overlaps the hinge support portion (9) when the cover (2) is attached to the support (3) thereto. During the opening and closing of the cover (2) there is no exposure of the lock to the user of the image forming apparatus (5) to which the device is attached as the cover (1) pivots relative to the support (3), meaning that the device cannot be corrupted in such a way that the toner cartridge can be replaced without complying to conditions relating to a toner status, which cause the cover (2) to unlock (vide infra).

As shown in both FIG. 6A and FIG. 6B, the device (1) includes a receiving part (12) of the hinge portion (8) with which the moveable locking member (10) cooperates in order to lock the cover (2) in the closed position. For example, an interior of part of the hinge portion (8) of the cover (2) may be complementary in shape to the moveable locking member (10), thereby forming the receiving part (12) of the hinge portion (8) of the cover (2) which receives the moveable locking member (10). For instance, the moveable locking member (10) may be a pin, and this pin may cooperate with a circular receiving part (12) formed by the hinge portion (8) of the cover (2) to facilitate locking and unlocking of the cover (2). Specifically, when the cover (2) is unlocked the pin is retracted (FIG. 6B) and the cover (2) can freely rotate about the hinge portion (8), but when the cover (2) is locked the moveable locking member (10) is extended (FIG. 6A) and is received by the receiving part (12) so that the cover (2) is unable to rotate about the hinge portion (8).

Though the lock shown in FIG. 6A and FIG. 6B is electromechanical, the lock may be electromagnetic or some combination thereof. The lock is not restricted to a particular geometry or orientation. The lock may be configured to receive a signal from a controller (not shown), which is described later, whereby the solenoid moves the moveable locking member (10) in response to a signal received by from the controller generated based on the toner status of the corresponding toner cartridge (4).

In addition to concealing the lock of the device (1) by means of its position in relation to the hinge portion (8) and the hinge support portion (9), components of the device (1), including the lock, may be concealed by a front panel attached directly to the device (1) to obscure components from the user.

As already alluded to, whether a cover (2) is unlocked is controlled by a controller. The process of unlocking a cover (2) can be understood from FIG. 7. The controller is configured receive (S1) a signal indicative of toner status, send (S2) a signal to the lock according to a received signal indicative of toner status to unlock the cover (2) by retracting the moveable locking member (10), thereby unlocking (S3) the cover (2). Once the cover (2) is unlocked, it may be moved to the open position by the user so that the toner cartridge (4) can be accessed.

This signal may be received from the image forming apparatus (5) to which the device (1) is attached or in which the device (1) is incorporated. In the case of the device (1) being retrofitted to an existing product, the signal may be received from complementary software retrospectively installed on the image forming apparatus (5) and configured to monitor toner status and send a signal to the device (1) indicative of toner status.

Toner status may refer to the volume or mass of ink remaining in the toner cartridge (4). A signal indicative of toner status may indicate that the toner cartridge (4) is empty, empty being defined according to predetermined criteria. For example, a toner cartridge (4) may be defined as empty if the volume of ink remaining in the toner cartridge (4) falls below a predetermined threshold. A signal indicative of a toner cartridge (4) being empty is received by the controller, which, in response, causes the cover (2) corresponding to the empty toner cartridge to unlock so that the user can access the toner cartridge (4) to replace it. If no signal is received by the controller indicative of the toner status, such as the toner cartridge (4) being empty, the cover (2) remains locked and cannot be opened. Consequently, the user cannot prematurely change the toner cartridge (4).

In addition to the signal indicative of toner status, to unlock the cover (2) the device (1) may require the user to input authentication information. Only once this authentication information is validated by an authentication reception and validation unit is the cover (2) unlocked such that the user can open the cover (2) and access the toner cartridge (4).

Manual override of the controller may be required but must only be available to permitted users (e.g. service engineers). This safeguard is implemented by some form of password protection, for example, in the control system. A static password could be readily defeated and so is not considered sufficient. Instead a password derived from a continually changing root is proposed. In one embodiment, the password could be based on a simple formula to generate 4 digits from the current date. The device (1) would be provided with the necessary information to verify such a password at the point of manufacture. The method of generating the password would not be publicised. Instead, the currently active password would be issued to permitted personnel upon request. Passwords would have a limited period of validity and they can be issued by a trusted source only, limiting the potential for non-permitted users to obtain and exploit the manual override feature. Other means of restricting access to a manual override feature (e.g. user defined passwords, physical keys, biometric verification, etc.) are not precluded by this embodiment.

Each cover (2) may have a corresponding sensor (not shown), such as a limit switch, which senses whether the cover (2) is in the open or the closed position. The sensor is configured to send a signal to the controller indicative of the position of the cover (2). In response to this signal, the controller causes the cover (2) to be locked only if the controller receives a signal indicating that the cover (2) is in the closed position. The locking of the cover (2) is activated only when the cover (2) is closed and not, for example, by a signal relating to whether the toner cartridge (4) is empty or full. Consequently the lock is not activated inappropriately.

Due to the above described construction of the device (1), the device (1) is configured to cause the cover (2) to remain locked in the event of a failure of power or a failure of the controller. In this way, users cannot gratuitously replace toner cartridges (4) when the device (1) is powered off, and the integrity of the device (1) is maintained. As power is required by the device (1) in order to retract the moveable locking member (10), for example, without power being provided to the device (1) or without the controller being able to send a signal, a closed cover (2) cannot be unlocked. The default state of the cover (2) is that it is locked.

The device (1) may be retrofitted to an existing product, as oppose to forming an integral part of a product. That is, the device (1) may be attached to an already manufactured image forming apparatus (5) rather than being incorporated during the manufacturing process. Mechanical attachment of the device (1) to the image forming apparatus (5) may be achieved by concealed fixings, security fixings or adhesive bond between the device (1) and a convenient face of the image forming apparatus (5). A cable may link a USB socket of the image forming apparatus (5) to the device (1), thereby providing both power to the device (1) and the facility to transfer signals between the device (1) and the image forming apparatus (5). Alternative embodiments could utilise some form of wireless communication. Similarly, power could be supplied to the device (1) by a dedicated supply, internal battery or by modifying the existing hardware of the image forming apparatus (5).

As already mentioned, the device (1) may be incorporated in an apparatus for additive manufacturing or freeform fabrication (e.g. a 3D printer), as opposed the image forming apparatus (5) (e.g. a 2D printer) shown in FIG. 2A and FIG. 2B. When attached to a 3D printer the device (1) operates in the same manner conferring the same associated advantages and benefits as when attached to a 2D printer (FIG. 2A and FIG. 2B). One such advantage being that during the opening and closing of the cover (2), because of the location of the lock relative to the cover (2), there is no exposure of the lock to the user of the 3D printer to which the device is attached as the cover (2) pivots relative to the support (3).

FIG. 8 shows this alternative embodiment where a 3D printer (15) is provided with the device (1). In FIG. 8, the device (1) is positioned such that the cover (2) prevents access to a container for dispensing object forming material (16), the cover (2) being locked in the closed position by a lock which is constructed as described earlier in relation to FIGS. 6A and 6B. As explained previously, the cover (2) may equally be substituted for any type of barrier, whereby a container (16) cannot be replaced without complying with conditions relating to container status. To this end, the device (1) of FIG. 8 also comprises a controller as previously described. As shown in FIG. 8, the device (1) may have a support (3) to which the cover (2) is attached. For a 3D printer, an object forming material is that which is used to fabricate the printed object. Examples of object forming materials in the case of a 3D printer include thermoplastics, photopolymers, metal alloys, metal-binder mixtures and thermoplastic powders.

FIG. 8 shows a 3D object fabrication chamber (18) of the 3D printer (15) where the object is manufactured. In FIG. 8, the chamber (18) is a cuboid and located adjacent to the container for dispensing object forming material (16), but the geometry of the 3D printer (15) is not restricted to that shown in FIG. 8. For instance, the chamber (18) is not restricted to a cuboid. In the chamber (18), the object may be manufactured by applying a series of layers of the object forming material dispensed from the container (16), each layer being cured before a subsequent layer is applied, in order to fabricate the 3D object. During the manufacturing process, the chamber (18) may be sealed by closing chamber access doors (17), which are used to access the printed object once printing is completed, meaning that the 3D object manufacturing process is not adversely effected by environmental conditions (e.g. humidity).

In FIG. 8, there is one container for dispensing object forming material (16) and hence the device (1), in this example, only includes a single cover (2). However, as mentioned earlier, the device may comprise any number of covers appropriate to control access to each of the containers (16). The embodiment of the device shown in FIG. 8 is directly analogous to that shown in FIG. 2B, and the construction of the components of the device is the same as described in relation to all the preceding figures.

It will be appreciated by the person of skill in the art that various modifications may be made to the above described embodiments without departing from the scope of the present invention as defined in the claims.

The present application is based on and claims priority of United Kingdom Priority Application No. GB1903438.8 filed on Mar. 13, 2019, the entire contents of which are hereby incorporated herein by reference.

The invention claimed is:

1. A device for controlling user access to multiple containers for dispensing a printing material housed by a printing apparatus, the device comprising:

operable and closable barriers, wherein each of the barriers is configured to cover a corresponding one of the containers;

locks, each of which is configured for locking a corresponding one of the barriers in a closed position, wherein each of the locks is obscured by the corresponding one of the barriers when viewed from a front of the device and the corresponding one of the barriers is in the closed position; and indicators, each of which is configured for indicating to a user whether the corresponding one of the barriers is locked, wherein each of the locks is overlapped by at least a portion of the corresponding one of the barriers both when the corresponding one of the barriers is in the closed position and when the corresponding one of the barriers is in an open position.

2. The device of claim 1, wherein each of the locks is overlapped by a part of a hinge portion of the corresponding one of the barriers when the corresponding one of the barriers is in the open position.

3. The device of claim 1, wherein each of the locks comprises a moveable locking member that cooperates with said part of the hinge portion in order to lock the corresponding one of the barriers in a closed position.

4. The device of claim 3, wherein an interior of said part of the hinge portion is complementary in shape to the moveable locking member, whereby said part of the hinge portion is configured to receive the moveable locking member.

5. The device of claim 3, wherein each of the locks comprises a solenoid for moving the moveable locking member.

6. The device of claim 1, further comprising a support to which the corresponding one of the barriers is attached.

7. The device of claim 6, wherein each of the indicators is located on the support and protrudes through an opening in the corresponding one of the barriers.

8. The device of claim 6, wherein each of the indicators is located on areas of the support not covered by the corresponding one of the barriers.

9. The device of claim 1, further comprising a controller, wherein the controller is configured to unlock each of the barriers according to a signal indicative of a printing material status of the corresponding one of the containers.

10. The device of claim 9, wherein the signal indicates that the corresponding one of the containers is empty, empty being defined according to predetermined criteria.

11. The device of claim 9, wherein the device is configured to lock each of the barriers in a closed position in the event of a failure of the controller.

12. The device of claim 1, further comprising a sensor for detecting the position of each of the barriers.

13. The device of claim 12, wherein each of the barriers is locked according to the sensed position.

14. The device of claim 1, wherein the device is configured to lock each of the barriers in a closed position in the event of power failure or a failure of the controller.

15. The device of claim 1, wherein each of the containers is any one of a colorant container, a toner cartridge, a toner bottle, an ink bottle and an ink cartridge.

* * * * *